United States Patent
Anders et al.

(10) Patent No.: US 9,924,391 B2
(45) Date of Patent: Mar. 20, 2018

(54) CLIENT-SIDE DYNAMIC FREQUENCY SELECTION CHECK

(71) Applicant: Microsoft Technology Licensing, LLC, Redmond, WA (US)

(72) Inventors: Billy Anders, Bothell, WA (US); Yatharth Gupta, Kirkland, WA (US); Aaron Cunningham, Redmond, WA (US); Amer Hassan, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 89 days.

(21) Appl. No.: 14/623,496

(22) Filed: Feb. 16, 2015

(65) Prior Publication Data

US 2016/0242051 A1 Aug. 18, 2016

(51) Int. Cl.
*H04W 24/08* (2009.01)
*H04W 76/02* (2009.01)
*H04W 16/14* (2009.01)
*H04W 72/02* (2009.01)
*H04W 72/04* (2009.01)
*G01S 7/02* (2006.01)
*H04W 84/12* (2009.01)

(52) U.S. Cl.
CPC .......... *H04W 24/08* (2013.01); *H04W 16/14* (2013.01); *H04W 72/02* (2013.01); *H04W 76/023* (2013.01); *G01S 7/021* (2013.01); *H04W 72/0453* (2013.01); *H04W 84/12* (2013.01)

(58) Field of Classification Search
None
See application file for complete search history.

(56) References Cited

U.S. PATENT DOCUMENTS

| 6,697,013 B2 | 2/2004 | McFarland et al. |
| 7,289,056 B2 | 10/2007 | Liu et al. |
| 7,606,193 B2 | 10/2009 | McFarland et al. |
| 7,702,044 B2 | 4/2010 | Nallapureddy et al. |

(Continued)

FOREIGN PATENT DOCUMENTS

| CN | 102137254 A | 7/2011 |
| WO | 2007091203 A1 | 8/2007 |

(Continued)

OTHER PUBLICATIONS

"International Search Report and Written Opinion Issued in PCT Application No. PCT/US2016/016476", dated Aug. 3, 2016, 17 Pages.

(Continued)

*Primary Examiner* — Christine Duong
(74) *Attorney, Agent, or Firm* — Arent Fox LLP

(57) ABSTRACT

In one example, a Wi-Fi client device may streamline a dynamic frequency selection check using a channel baseline measurement. The Wi-Fi client device may select a sampling size for a dynamic frequency selection check based on a channel baseline measurement for a dynamic frequency selection Wi-Fi channel. The Wi-Fi client device may execute the dynamic frequency selection check using the sampling size on the dynamic frequency selection Wi-Fi channel. The Wi-Fi client device may establish a Wi-Fi Direct connection based on the dynamic frequency selection check.

20 Claims, 13 Drawing Sheets

(56) References Cited

U.S. PATENT DOCUMENTS

| | | | |
|---|---|---|---|
| 8,190,162 B2 | 5/2012 | Hansen | |
| 2005/0206554 A1* | 9/2005 | Yamaura | H04B 1/401 342/70 |
| 2008/0075038 A1 | 3/2008 | Jin et al. | |
| 2009/0116411 A1 | 5/2009 | Castagnoli et al. | |
| 2010/0225530 A1 | 9/2010 | Lin et al. | |
| 2012/0083218 A1 | 4/2012 | Gossain et al. | |
| 2012/0140646 A1* | 6/2012 | Stephens | H04W 16/14 370/252 |
| 2012/0166671 A1 | 6/2012 | Qi et al. | |
| 2012/0258749 A1 | 10/2012 | Lenzini et al. | |
| 2013/0171941 A1 | 7/2013 | Kenney et al. | |
| 2013/0194944 A1 | 8/2013 | Soyak et al. | |
| 2013/0314267 A1 | 11/2013 | Kenney et al. | |
| 2014/0003237 A1* | 1/2014 | Kenney | H04W 28/10 370/235 |
| 2014/0241187 A1* | 8/2014 | Barkay | H04W 76/043 370/252 |

FOREIGN PATENT DOCUMENTS

| | | |
|---|---|---|
| WO | 2013022293 A2 | 2/2013 |
| WO | 2014190004 A1 | 11/2014 |

OTHER PUBLICATIONS

"Second Written Opinion Issued in PCT Application No. PCT/US2016/016476", dated Jan. 9, 2017, 6 Pages.

"What's New in 802.1X Authenticated Wireless Access", Available at: <<https://technet.microsoft.com/en-us/library/dn452409.aspx>>, Sep. 18, 2013, 3 pages.

Dong, et al., "Dynamic Frequency Selection (DFS) in IEEE802.16e OFDM System Working at Unlicensed Bands", In Proceedings of The 9th International Conference on Advanced Communication Technology, Feb. 12, 2007, pp. 1330-1334.

"Ddual Wwifi 2.4 and 5ghz Miracast Dongle", Available at: <<http://www.alibaba.com/product-detail/dual-wifi-2-4-and-5ghz_60049135212.html>>, Retrieved on: Jan. 27, 2015, 8 pages.

* cited by examiner

| CD ID 410 | AP ID 420 | ZONE FLAG 430 | CHANNELS 440 | SECURITY 450 |

CLIENT-SIDE DYNAMIC FREQUENCY SELECTION CHECK

BACKGROUND

A Wi-Fi client device may wirelessly connect to the internet by connecting to an internet service via an access point on a Wi-Fi band described in the Wi-Fi protocol. The Wi-Fi protocol assigns the 2.4 GHz ultra-high frequency (UHF) and the 5 GHz super high frequency (SHF) radio band for use by the internet service access point for wireless transmission. The Wi-Fi client device may create a peer-to-peer connection with a secondary device on the Wi-Fi radio bands by following the Wi-Fi Direct Protocol®.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Examples discussed below relate to a Wi-Fi client device streamlining a dynamic frequency selection check using a channel baseline measurement. The Wi-Fi client device may select a sampling size for a dynamic frequency selection check based on a channel baseline measurement for a dynamic frequency selection Wi-Fi channel. The Wi-Fi client device may execute the dynamic frequency selection check using the sampling size on the dynamic frequency selection Wi-Fi channel. The Wi-Fi client device may establish a Wi-Fi Direct connection based on the dynamic frequency selection check.

DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

FIG. 4 illustrates, in a block diagram, one example of an access response.

DETAILED DESCRIPTION

Figure 1:
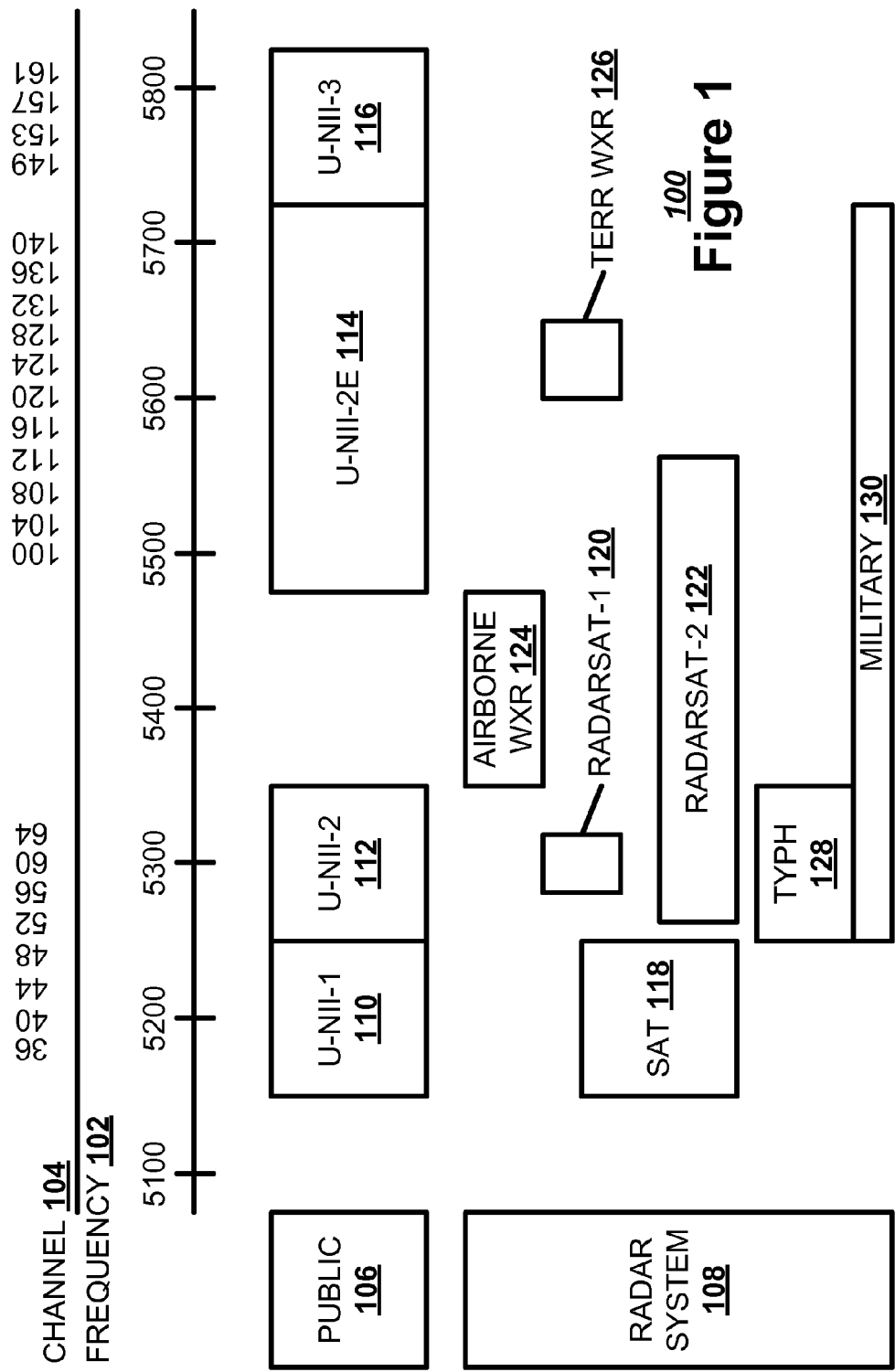
FIG. 1 illustrates, in a block diagram, one example of a Wi-Fi frequency band.

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a Wi-Fi client device, a tangible machine-readable medium having a set of instructions detailing a method stored thereon for at least one processor, or a method implemented at a Wi-Fi client device.

In parts of the 5 GHz band, Wi-Fi users and other users of the unlicensed band may be subject to regulations governing the detection of radar. Upon detection of a radar transmission, the users are to avoid corresponding channels, according to the regulations of the Federal Communications Commission. The detection criteria, such as pulse widths, pulse rates, and probability thresholds, were negotiated with the primary spectrum users, such as the military.

A key parameter of the regulations is the probability threshold that dictates the number of samples and duration to clear a channel. The probability threshold regulation states that a device may use a channel if the probability of radar usage on a channel is below a set amount. Typically, detection mechanisms may rely on block sampling done without a priori knowledge of whether a radar is being detected in proximity or not.

For example, during "power up" and while "in service", a Wi-Fi device may detect a set of 18 radar pulses, allowing the Wi-Fi device to filter out false detects. The detection threshold may be −64 dBm for 1 W of Wi-Fi or −62 dBm for 200 mW of Wi-Fi.

The pulse width may be 1 to 100 μsec, with a pulse repetition frequency of 250-4000. The Wi-Fi device may execute a channel availability check before entering a channel, considered valid for 24 hours. The Wi-Fi device may leave the channel within 10 seconds, with a 260 msec transmit allowance for channel switching and a 30 minute re-entrancy delay. The regulations may protect most known radars, including military radars.

The Wi-Fi device may perform such a dynamic frequency selection check on any Wi-Fi channel subject to dynamic frequency selection regulation, referred to herein as a "dynamic frequency selection Wi-Fi channel". The Wi-Fi device may statistically improve the dynamic frequency selection detection based on prior knowledge of a clear channel, referred to herein as a channel baseline measurement, such as the use by an internet service or proximity to channels in use. The Wi-Fi device may reduce the sample size of the dynamic frequency selection check based on the channel baseline measurement. For example, the Wi-Fi device may use the knowledge that an access point of an internet service connected to the Wi-Fi device has cleared a dynamic frequency selection Wi-Fi channel. The Wi-Fi device may achieve the same probability that the channel is clear using a sample one-fourth the size of a sample used with no prior knowledge. A Wi-Fi device may perform an offline check on dynamic frequency selection Wi-Fi channels in proximity. The Wi-Fi device may create a virtual connection to build a radio frequency map in proximity of an active Wi-Fi channel. An internet service access point may clear sample channels beforehand using sequential detection. The Wi-Fi device may avoid discarding samples in blocks by associating a history with a weight associated with each sample or blocks of samples.

The Wi-Fi device may perform these channel operations more efficiently by adjusting the communication cycle. A channel operation is an operation the Wi-Fi device undertakes to maintain the connection with another device. Typically in a communication cycle, the Wi-Fi device may execute a communication operation during a brief operation window, followed by a period of inactivity during a lengthier standby window. The Wi-Fi device may use the standby window to conserve energy or allow device or network resources to be used by other operations. The Wi-Fi device may insert a status window into the standby window or between the standby window and the operation window to allow the client device to perform a channel status check to determine the status of the communication channel. The Wi-Fi device may execute the channel status check as a block channel status check or a sequential channel status check. In a block channel status check, the Wi-Fi device may process a fixed number of samples in a status window. In a sequential channel status check, the Wi-Fi device may process a variable number of samples in a series of status windows. The Wi-Fi device may then execute a channel operation based on the channel status check.

Thus, in one example, a Wi-Fi client device may streamline a dynamic frequency selection check using a channel baseline measurement. The Wi-Fi client device may establish a Wi-Fi connection on a dynamic frequency selection Wi-Fi channel with an internet service access point. The Wi-Fi client device may select a sampling size for a dynamic frequency selection check based on a channel baseline measurement for the dynamic frequency selection Wi-Fi channel. The Wi-Fi client device may execute the dynamic frequency selection check using the sampling size on the dynamic frequency selection Wi-Fi channel. The Wi-Fi client device may establish a peer-to-peer connection that follows the Wi-Fi Direct® protocol, referred to herein as a Wi-Fi Direct connection, on the dynamic frequency selection Wi-Fi channel with a group owner device based on the dynamic frequency selection check.

As more systems use the commercially available bandwidth, certain reserved frequencies may be made available for public use when not in use by the government. The Federal Communication Commission may subject these frequencies to various protection mechanisms to prevent public users from interfering with governmental actions. For example, a transmitter may execute a transmit power control check to reduce the transmission output power when detecting another network. Further, a transmitter may execute a dynamic frequency selection check to identify if a frequency is being used by a government entity. If the transmitter detects that the frequency is in use, the transmitter may switch to another frequency.

FIG. 1 illustrates, in a block diagram, one example of a Wi-Fi frequency band 100. The Wi-Fi protocol assigns frequencies 102 at 2.4 GHz and 5 GHz for wireless transmission. The Wi-Fi frequency band 100 may group a frequency range 102 into one or more channels 104. The Wi-Fi frequency band 100 may be used for public bands 106 or radar system bands 108. A public band 106 is a range of frequencies available for public commercial use. A radar system band 108 is a range of frequencies reserved for government use.

In the public bands 106, the frequency band 100 may have an Unlicensed National Information Infrastructure (U-NII) level 1 band 110 from 5.15 GHz to 5.25 GHz. The Unlicensed National Information Infrastructure level 1 band 110 may broadcast indoors at 200 mW. The Unlicensed National Information Infrastructure level 1 band 110 may forgo performing a dynamic frequency selection check or a transmit power control check. The frequency band 100 may have an Unlicensed National Information Infrastructure level 2 band 112 from 5.25 GHz to 5.35 GHz. The Unlicensed National Information Infrastructure level 2 band 112 may broadcast predominantly indoors at 200 mW. The Unlicensed National Information Infrastructure level 2 band 112 may be subject to a dynamic frequency selection check or a transmit power control check to maintain compliance with Federal Communication Commission standards. The frequency band 100 may have an Unlicensed National Information Infrastructure level 2, part E band 114 from 5.47 GHz to 5.725 GHz. The Unlicensed National Information Infrastructure level 2, part E band 114 may broadcast indoors or outdoors at 1 W. The Unlicensed National Information Infrastructure level 2, part E band 114 may be subject to a dynamic frequency selection check or a transmit power control check to maintain compliance with Federal Communication Commission standards. The frequency band 100 may have an Unlicensed National Information Infrastructure level 3 band 116, also referred to as an industrial, scientific and medical (ISM) radio bands, from 5.725 GHz to 5.825 GHz. The Unlicensed National Information Infrastructure level 3 band 116 may transmit point-to-multipoint at 4 W. The Unlicensed National Information Infrastructure level 3 band 116 may forgo a dynamic frequency selection check or a transmit power control check.

In the potential radar system bands 108, the frequency band 100 may have a satellite band 118 from 5.15 GHz to 5.25 GHz to receive uplink and downlink transmissions. The frequency band 100 may have dedicated frequencies 104 for synthetic aperture radar communications, such as Canada's RADARSAT-1 120 at 5.28 GHz to 5.32 GHz and RADARSAT-2 122 at 5.35 GHz to 5.45 GHz. The frequency band 100 may have dedicated frequencies 104 for flight and weather radar, such as airborne weather radar (WXR) 124 at 5.35 GHz to 5.47 GHz, enhanced ground proximity warning system terrain data (TERR WXR) 126 at 5.6 GHz to 5.65 GHz, or the Japanese Typhoon (TYPH) weather radar 128 at 5.25 GHz to 5.35 GHz. The frequency band 100 may have dedicated frequencies 104 for the military 130 from 5.25 GHz to 5.725 GHz.

Figure 2:
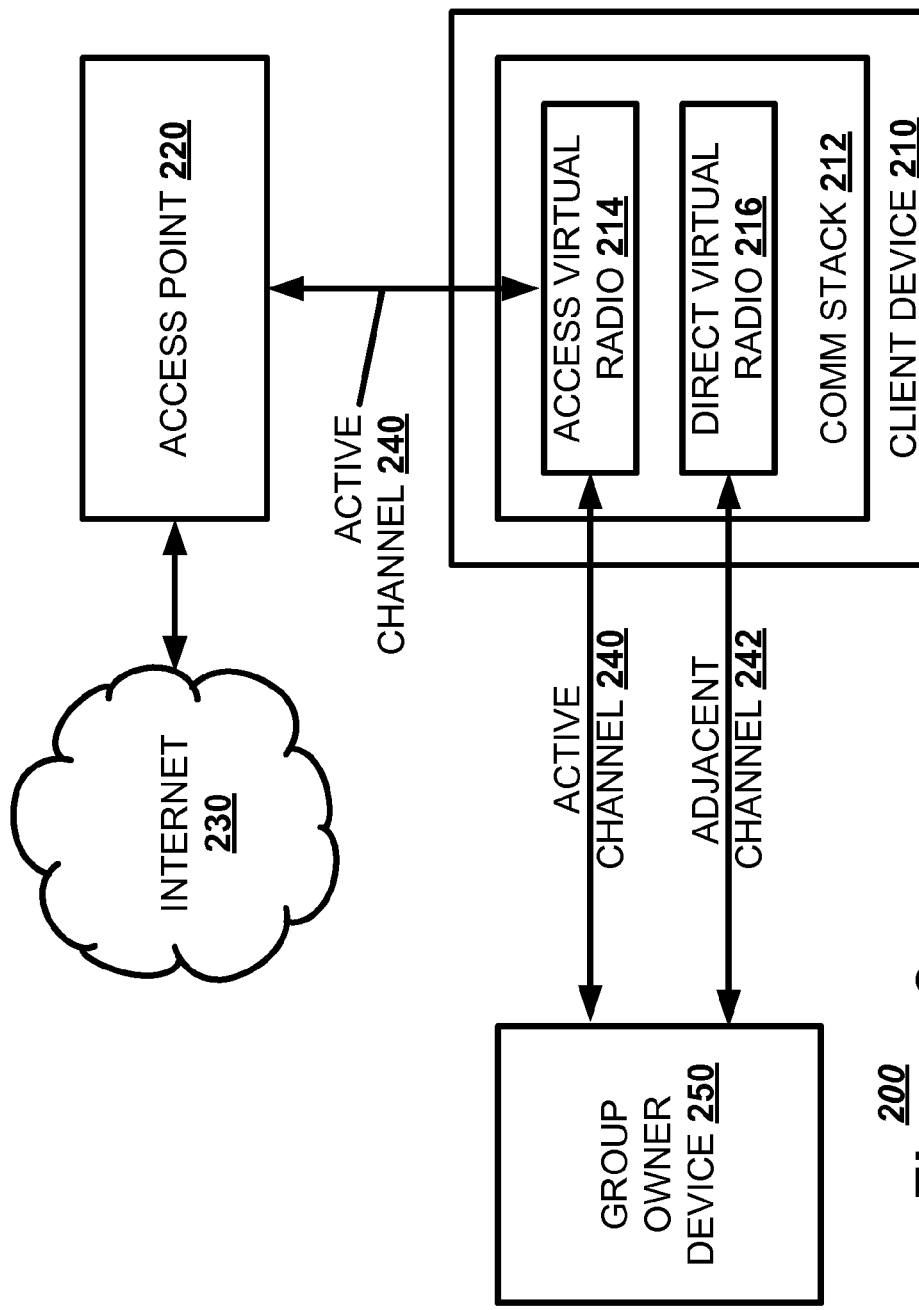
FIG. 2 illustrates, in a block diagram, one example of a local area network.

A local area network may execute a dynamic frequency selection check when using dynamic frequency selection Wi-Fi channels. FIG. 2 illustrates, in a block diagram, one example of a local area network 200. A Wi-Fi client device 210 may wirelessly connect to an access point 220 for an internet service provider to connect to the internet 230. The Wi-Fi client device 210 may implement a communication stack 212 to manage a radio of a communication interface to access a range of radio frequencies represented as an active channel 240. The active channel 240 may transmit data between the internet service access point 220 and the Wi-Fi client device 210. The active channel 240 may be a channel in the bandwidth of frequencies described in the Wi-Fi protocol.

If the active channel 240 is in the range of frequencies subject to a dynamic frequency selection check, making the active channel 240 a dynamic frequency selection Wi-Fi channel, the internet service access point 220 may have the responsibility of performing that check. The internet service access point 220 may perform the dynamic frequency selection check at power up, and again at an interval mandated by the Federal Communication Commission. Generally, the internet service access point 220 may perform the dynamic frequency selection check by taking a sampling of receptions at the active channel 240 to determine the probability that a government user is present on the active channel 240. The greater the sampling size, the greater the probability that the dynamic frequency selection check may clear the active channel 240, as well as the more power, time, and resources consumed. The Federal Communication Commission mandates the probability that the user is to achieve in clearing the active channel 240, rather than the sampling size. Thus, if the same probability may be determined with a smaller sampling size, a Wi-Fi device may use a smaller sampling size.

The Wi-Fi client device 210 may also use a channel in the Wi-Fi range of frequencies to communicate with a secondary device on a peer-to-peer basis, without having to use the internet service access point 220 as an intermediary. This peer-to-peer basis, referred to as Wi-Fi Direct®, allows a Wi-Fi client device 210 to reduce the number of radios resident on the Wi-Fi client device 210 by using the same radio for accessing the internet 230 and communicating with a secondary device in a peer-to-peer format. A group owner device 250 is a secondary device that interacts with multiple devices on a peer-to-peer level. The Wi-Fi client device 210 may use the same active channel 240 to connect to the group owner device 250 as the internet service access point 220. Alternately, the Wi-Fi client device 210 may use an adjacent channel 242 to the active channel 240 to connect to the group owner device 250. The Wi-Fi client device 210 may use two radios to establish the connections, one for the active channel 240 and one for the adjacent channel 242. Alternately, the communication stack 212 may virtualize one radio to act as both an access virtual radio 214 to communicate on the active channel 240 and a direct virtual radio 216 to communicate on the adjacent channel 242. While the communication stack 212 may virtualize two radios for any two channels, adjacent channels may allow for a more efficient performance by the two virtual radios.

As the Wi-Fi client device 210 is initiating the interaction, the Wi-Fi client device 210 has responsibility for performing the dynamic frequency selection check. As the Wi-Fi client device 210 is not necessarily in the same location as the internet service access point 220, the transmission range of the Wi-Fi client device 210 does not overlap one hundred percent with the transmission range of the internet service access point 220. The Wi-Fi client device 210 may not just use the dynamic frequency selection check performed by the internet service access point 220 in place of performing one itself. However, by using the dynamic frequency selection check performed by the internet service access point 220 on the active channel 240 as a channel baseline measurement, the Wi-Fi client device 210 may reduce the sampling size for its own dynamic frequency selection check yet still achieve the same probability that the active channel 240 is clear. Additionally, if the internet service access point 220 has performed a dynamic frequency selection check for adjacent channels 242 to the active channel 240, the internet service access point 220 may communicate this information to the Wi-Fi client device 210 for use in the dynamic frequency selection check by the Wi-Fi client device 210.

Figure 3:
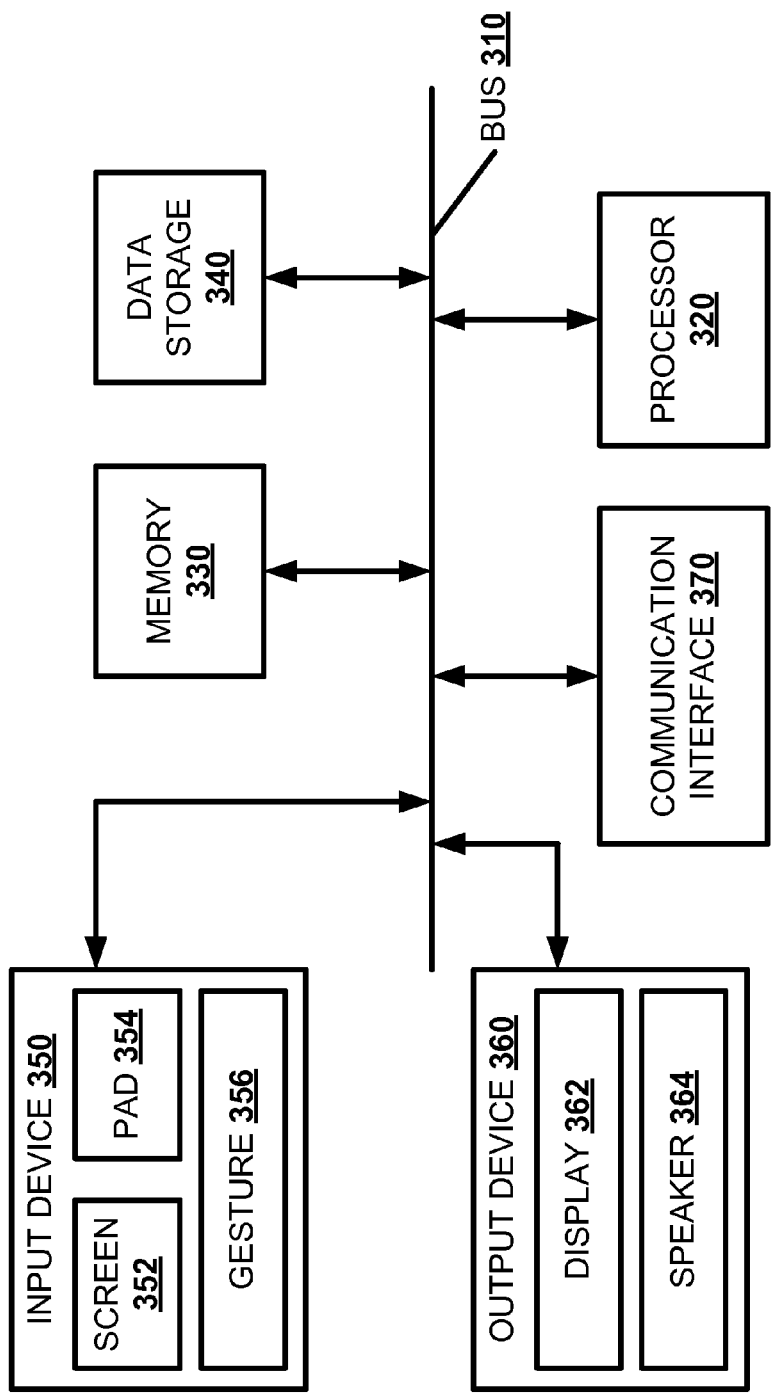
FIG. 3 illustrates, in a block diagram, one example of a computing device.

FIG. 3 illustrates a block diagram of an exemplary computing device 300 which may act as a Wi-Fi client device, an internet service access point, or a group owner device. The computing device 300 may combine one or more of hardware, software, firmware, and system-on-a-chip technology to implement a Wi-Fi client device, an internet service access point, or a group owner device. The computing device 300 may include a bus 310, a processor 320, a memory 330, a data storage 340, an input device 350, an output device 360, and a communication interface 370. The bus 310, or other component interconnection, may permit communication among the components of the computing device 300.

The processor 320 may include at least one conventional processor or microprocessor that interprets and executes a set of instructions. The processor 320 may establish a channel baseline measurement based on a Wi-Fi connection over a dynamic frequency selection Wi-Fi channel with an internet service access point. The processor 320 may select a sampling size for a dynamic frequency selection check for the dynamic frequency selection Wi-Fi channel based on the channel baseline measurement. The processor 320 may identify an alternate clear Wi-Fi channel, such as an adjacent clear Wi-Fi channel, transmitting from an internet service access point. The processor 320 may reduce the sample size based on identifying a controlled zone flag from the internet service access point. The processor 320 may identify a group owner device for the Wi-Fi Direct connection. The processor 320 may delegate the dynamic frequency selection check to a group owner device on the Wi-Fi Direct connection.

The memory 330 may be a random access memory (RAM) or another type of dynamic data storage that stores information and instructions for execution by the processor 320. The memory 330 may also store temporary variables or other intermediate information used during execution of instructions by the processor 320. The memory 330 may store a list of alternate cleared dynamic frequency selection channels describing channels that have passed a dynamic frequency selection check or are outside the frequency ranges where such precautions are mandated by the Federal Communications Commission. The memory 330 may prioritize an adjacent dynamic frequency selection channel to allow for ease of switching.

The data storage 340 may include a conventional ROM device or another type of static data storage that stores static information and instructions for the processor 320. The data storage 340 may include any type of tangible machine-readable medium, such as, for example, magnetic or optical recording media, such as a digital video disk, and its corresponding drive. A tangible machine-readable medium is a physical medium storing machine-readable code or instructions, as opposed to a signal. Having instructions stored on computer-readable media as described herein is distinguishable from having instructions propagated or transmitted, as the propagation transfers the instructions, versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained. The data storage 340 may store a set of instructions detailing a method that when executed by one or more processors cause the one or more processors to perform the method. The data storage 340 may also be a database or a database interface for storing channel configuration data.

The input device 350 may include one or more conventional mechanisms that permit a user to input information to the computing device 300, such as a keyboard, a mouse, a voice recognition device, a microphone, a headset, a touch screen 352, a touch pad 354, a gesture recognition device 356, etc. The output device 360 may include one or more conventional mechanisms that output information to the user, including a display screen 362, a printer, one or more speakers 364, a headset, a vibrator, or a medium, such as a memory, or a magnetic or optical disk and a corresponding disk drive.

The communication interface 370 may include any transceiver-like mechanism that enables computing device 300 to communicate with other devices or networks. The communication interface 370 may include a network interface or a transceiver interface. The communication interface 370 may be a wireless, wired, or optical interface. The communication interface 370 may execute an offline dynamic frequency selection check prior to the establishing the Wi-Fi Direct connection. The communication interface 370 may execute the dynamic frequency selection check using the sampling size on the dynamic frequency selection Wi-Fi channel. The communication interface 370 may establish a Wi-Fi Direct connection based on the dynamic frequency selection check. The communication interface 370 may maintain the Wi-Fi Direct connection during an operation window of a communication cycle. The communication interface 370 may perform a channel status check in a status window outside the operation window of the communication cycle.

The communication interface 370 may have one or more radios to access multiple frequencies simultaneously. Alternately, the communication interface 370 may be configured to represent an access virtual radio and a direct virtual radio. The access virtual radio may maintain an access point connection on the dynamic frequency selection Wi-Fi channel. The direct virtual radio to maintain the Wi-Fi Direct connection on an adjacent clear Wi-Fi channel.

The computing device 300 may perform such functions in response to processor 320 executing sequences of instructions contained in a computer-readable medium, such as, for example, the memory 330, a magnetic disk, or an optical disk. Such instructions may be read into the memory 330 from another computer-readable medium, such as the data storage 340, or from a separate device via the communication interface 360.

When a Wi-Fi client device sends an access request to the internet service access point seeking access to the internet, the internet service access point may reply with an access response. In this access response, the internet service access point may list the channels that the internet service access point have cleared with a dynamic frequency selection check. FIG. 4 illustrates, in a block diagram, one example of an access response 400 from an internet service access point. The access response 400 may have a Wi-Fi client device identifier 410 indicating the Wi-Fi client device receiving the access response 400. The access response 400 may have an internet service access point identifier 420 indicating the internet service access point sending the access response 400. The access response 400 may have a controlled zone flag indicating whether the internet service access point is located in a controlled zone. A controlled zone is a geographic area in which an access provider may guarantee that any channel accessible by a Wi-Fi client device passes the dynamic frequency selection check. The access response 400 may list the channels 440 the internet service access point has cleared with a dynamic frequency selection check. The access response 400 may describe any security protocols 450 the Wi-Fi client device may use to connect with the internet service access point.

Figure 5:
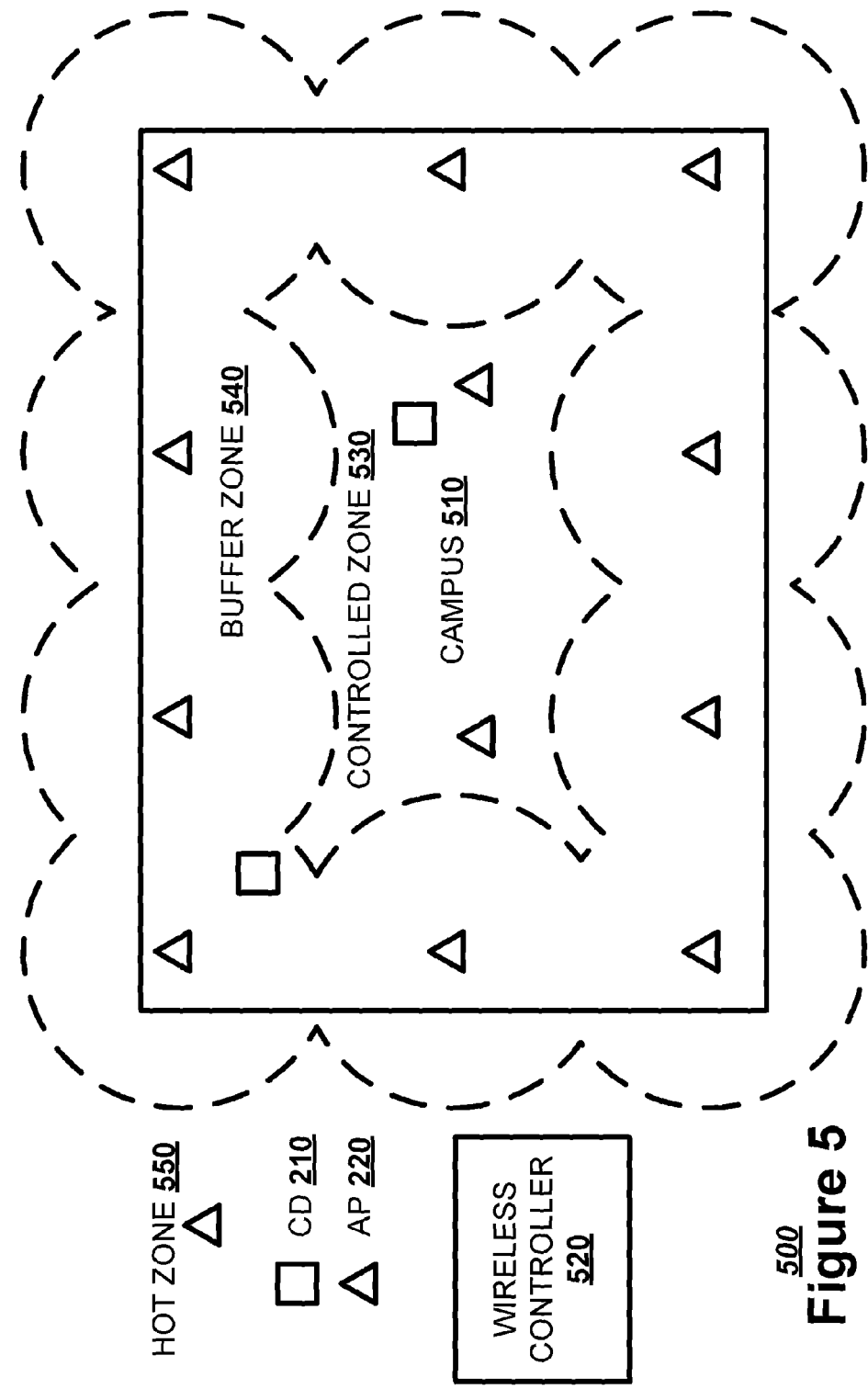
FIG. 5 illustrates, in a block diagram, one example of a Wi-Fi control area.

An internet service access point provider may allow a Wi-Fi client device to forgo performing a dynamic frequency selection check entirely by using a Wi-Fi control area to provide a controlled zone. FIG. 5 illustrates, in a block diagram, one example of a Wi-Fi control area 500. The Wi-Fi control area 500 may have a campus 510 covering the area controlled by the internet service access point provider, in which the access provider may exclude government users from accessing a dynamic frequency selection Wi-Fi channel. The Wi-Fi control area may use a wireless controller 520 to manage the internet service access points 220, such as internet service access point 220, in a Wi-Fi control area 500. The Wi-Fi control area 500 may have a controlled zone 530, in which an access provider may guarantee that any channel accessible by a Wi-Fi client device 210, such as Wi-Fi client device 210, receiving a signal from an internet service access point 220 passes the dynamic frequency selection check. The Wi-Fi control area 500 may have a buffer zone 540, in which the Wi-Fi client device 210 is entering the range of an internet service access point 220 on the outside edge of the campus 510. An internet service access point 220 in the buffer zone 240 may send the Wi-Fi client device 210 a buffer flag indicating that the Wi-Fi client device 210 is leaving the controlled zone 530. The Wi-Fi control area 500 may have a hot zone 550, in which the Wi-Fi client device 210 may access a channel that does not pass the dynamic frequency selection check.

Figure 6:
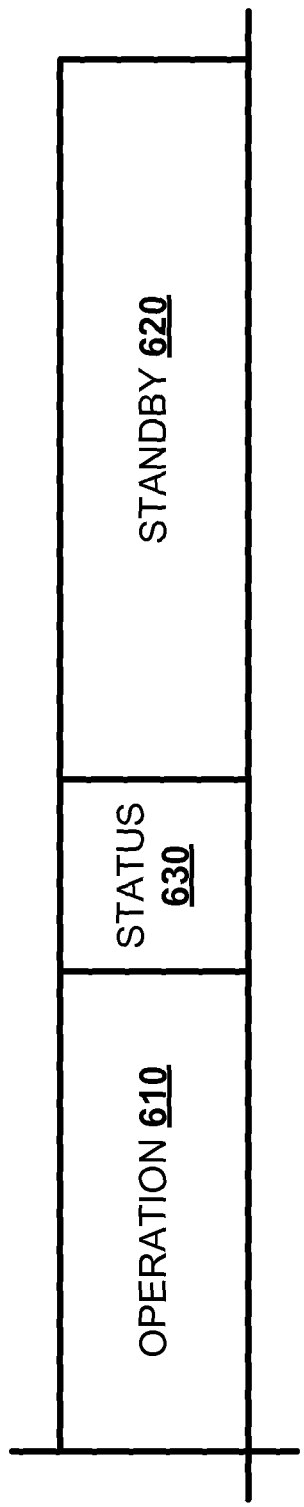
FIG. 6 illustrates, in a block diagram, one example of a communication cycle.

The Wi-Fi client device may further improve the efficiency of the dynamic frequency selection check by making use of lulls in the communication cycle. FIG. 6 illustrates, in a block diagram, one example of a communication cycle 600. The communication may have an operation window 610 for performing a communication operation. A communication operation is any action taken to transfer data between a Wi-Fi client device and a channel. For example, a communication operation may be uploading or downloading data from the channel. Typically, the operation window 610 may use eight percent of a communication cycle time. Normally, when the Wi-Fi client device exits the operation window 610, the Wi-Fi client device may enter a standby window 620. In a standby window 620, the Wi-Fi client device may power down communication components to conserve power. The Wi-Fi client device may insert a status window 630 to perform a channel status check on the channel. For example, the Wi-Fi client device may perform a dynamic frequency selection during the status window 630. The Wi-Fi client device may conserve energy by setting the status window 630 adjacent to the operation window 610 and outside the standby window 620, reducing power down and power up actions. The status window 630 may consume two percent of the communication cycle time. The Wi-Fi client device may execute a channel operation based on the channel status check. A channel operation is an operation performed by the Wi-Fi client device to maintain a Wi-Fi connection.

Figure 7:
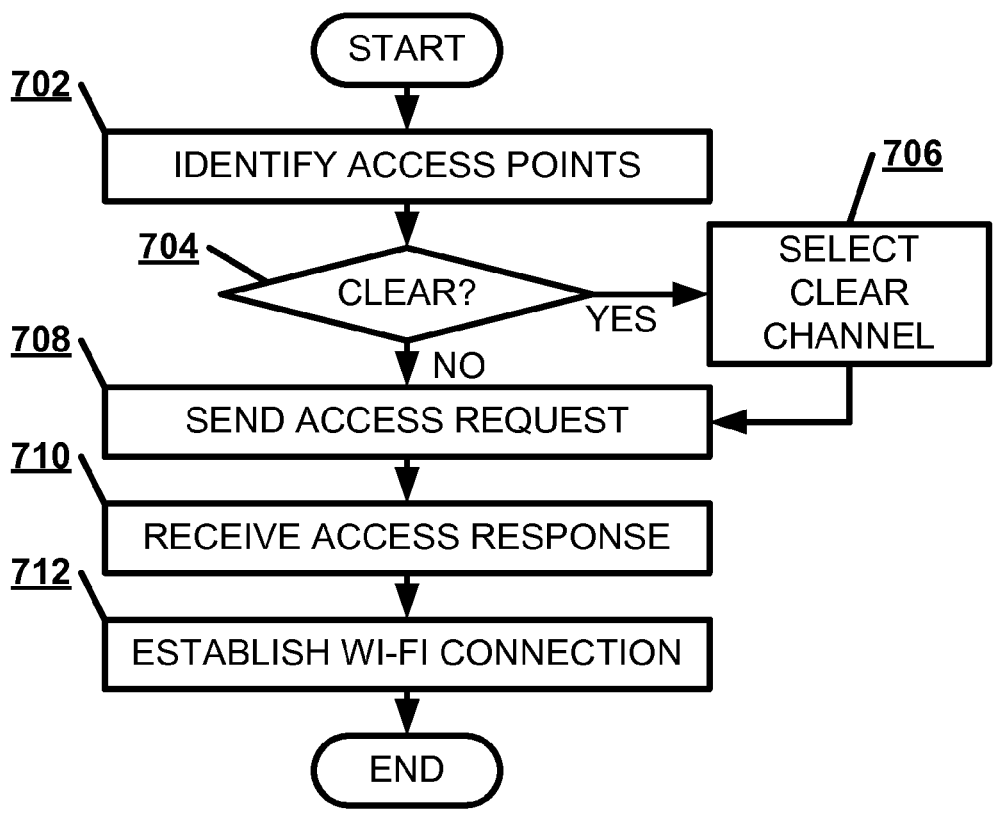
FIG. 7 illustrates, in a flowchart, one example of a method of establishing a Wi-Fi connection with an internet service access point using a Wi-Fi client device.

Both the Wi-Fi client device and the internet service access point may execute actions to create and maintain a Wi-Fi connection on a dynamic frequency selection Wi-Fi channel. FIG. 7 illustrates, in a flowchart, one example of a method 700 of establishing a Wi-Fi connection with an internet service access point using a Wi-Fi client device. The Wi-Fi client device may identify an internet service access point transmitting on an available Wi-Fi channel (Block 702). If the Wi-Fi client device identifies an internet service access point transmitting on a clear Wi-Fi channel (Block 704), the Wi-Fi client device may select that clear Wi-Fi channel to connect to that internet service access point (Block 706). A clear Wi-Fi channel is channel in the Wi-Fi range that a Wi-Fi client device may access without performing a dynamic frequency selection check. The Wi-Fi client device may send an access request to the internet service access point (Block 708). The Wi-Fi client device may receive an access response from the internet service access point (Block 710). The Wi-Fi client device may establish a Wi-Fi connection on a clear Wi-Fi channel, if available, or a dynamic frequency selection Wi-Fi channel with an internet service access point based on the access response (Block 712).

Figure 8:
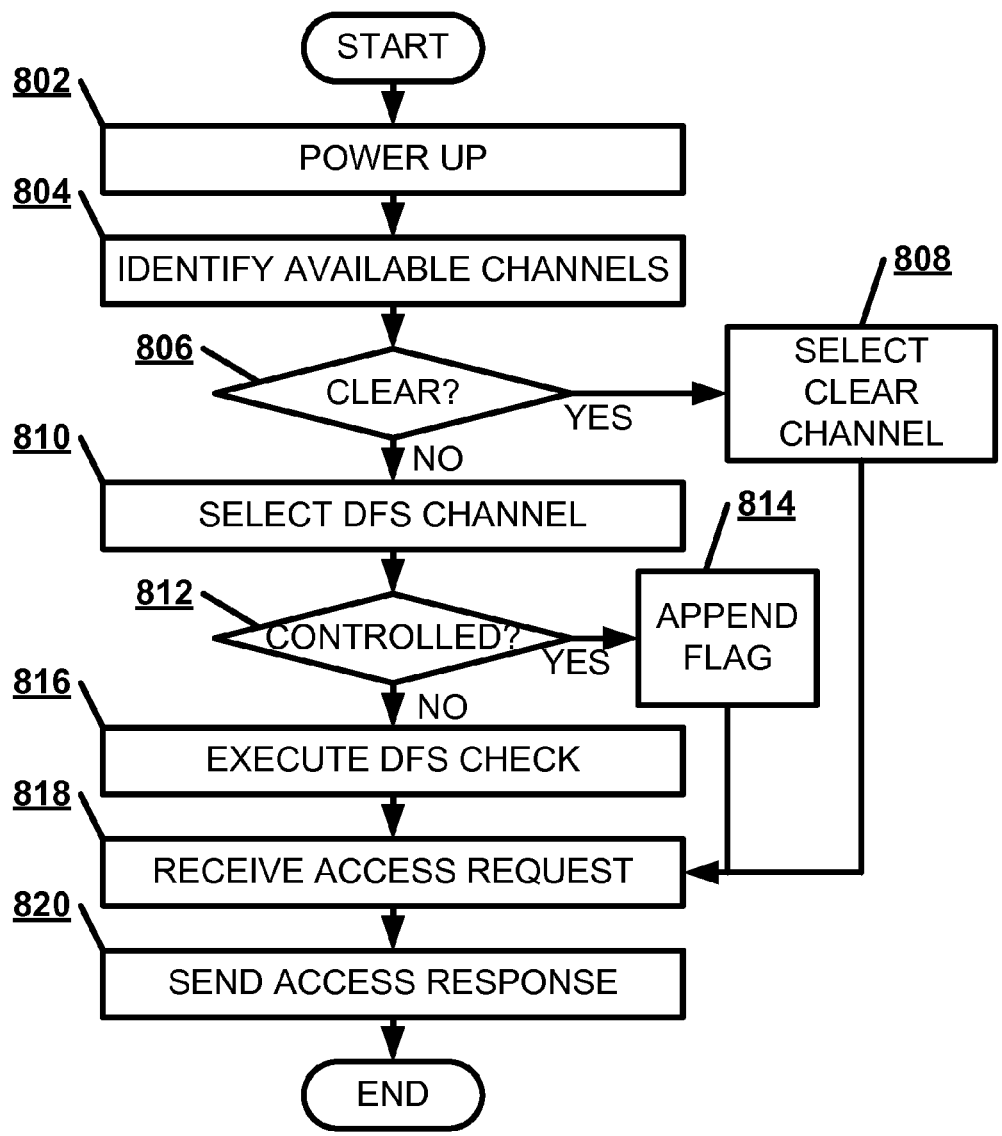
FIG. 8 illustrates, in a flowchart, one example of a method of establishing a Wi-Fi connection with a Wi-Fi client device using an internet service access point.

FIG. 8 illustrates, in a flowchart, one example of a method 800 of establishing a Wi-Fi connection with an internet service access point using a Wi-Fi client device. The internet service access point may power up (Block 802). The internet service access point may identify available Wi-Fi channels for use (Block 804). If a clear Wi-Fi channel is available (Block 806), the internet service access point may select the clear Wi-Fi channel (Block 808). Otherwise, the internet service access point may select a dynamic frequency selection Wi-Fi channel (Block 810). If the internet service access point is in a controlled zone (Block 812), the internet service access point may append a controlled zone flag to any future access responses (Block 814). Otherwise, the internet service access point may execute a dynamic frequency selection check upon power up (Block 816). The internet service access point may receive an access request from a Wi-Fi client device (Block 818). The internet service access point may send an access response to the Wi-Fi client device identifying the Wi-Fi channel (Block 820). The internet service access point may execute dynamic frequency selection checks at future intervals as mandated by the Federal Communications Commission.

Figure 9:
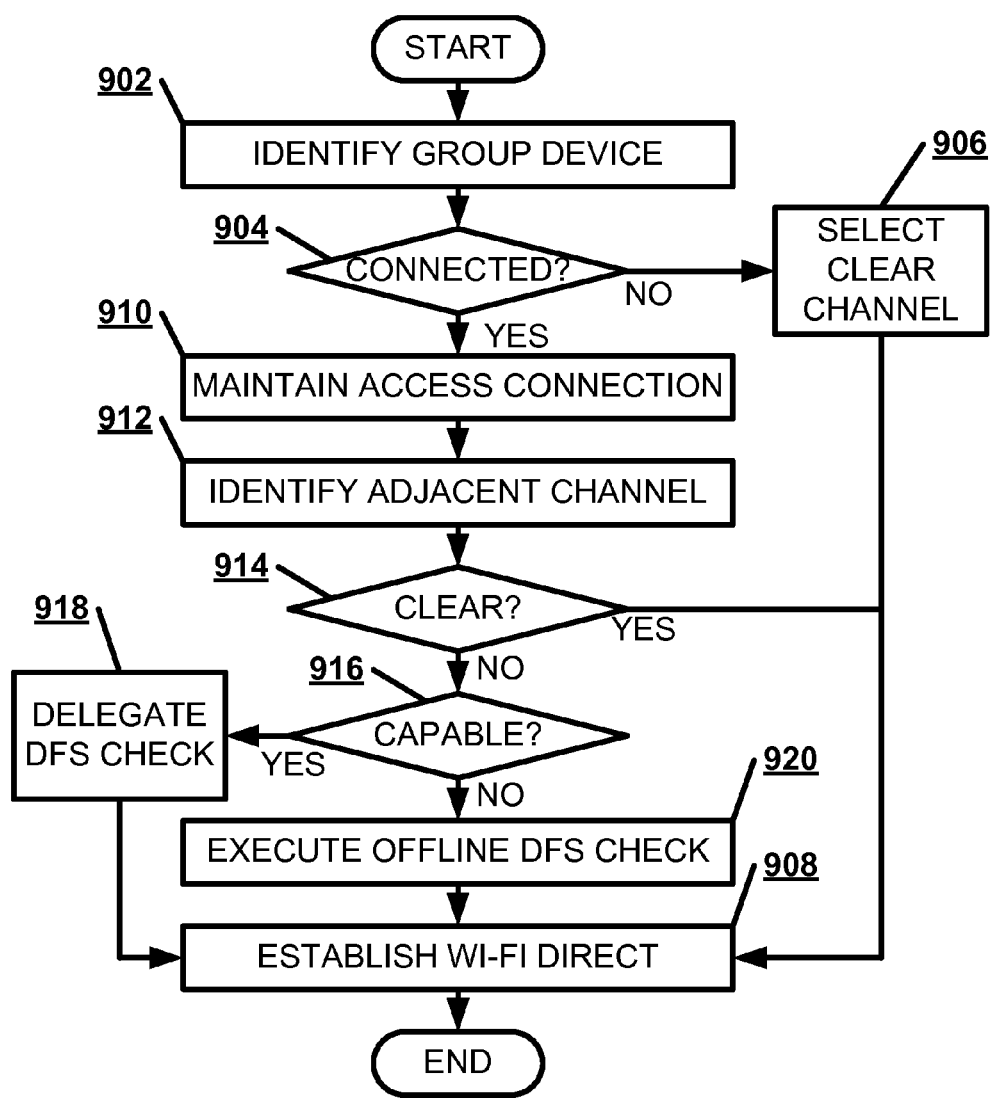
FIG. 9 illustrates, in a flowchart, one example of a method of establishing a Wi-Fi Direct connection with a group owner device using a Wi-Fi client device.

Both the Wi-Fi client device and a secondary device, such as a group owner device, may execute actions to create and maintain a Wi-Fi Direct connection on a dynamic frequency selection Wi-Fi channel. FIG. 9 illustrates, in a flowchart, one example of a method 900 of establishing a Wi-Fi Direct connection with a group owner device using a Wi-Fi client device. The Wi-Fi client device may identify a group owner device available for a Wi-Fi Direct connection (Block 902). If Wi-Fi client device is not connected to an internet service access point on a dynamic frequency selection Wi-Fi channel (Block 904), the Wi-Fi client device may select a clear Wi-Fi channel for establishing a Wi-Fi Direct connection (Block 906). The Wi-Fi client device may establish a Wi-Fi Direct connection on the clear Wi-Fi channel with the group owner device (Block 908). Otherwise, the Wi-Fi client device may maintain an access point connection on the active Wi-Fi channel, such as a dynamic frequency selection Wi-Fi channel or a clear Wi-Fi channel (Block 910). The Wi-Fi client device may identify any adjacent Wi-Fi channels to the active Wi-Fi channel (Block 912). If an adjacent Wi-Fi channel is a clear Wi-Fi channel (Block 914), the Wi-Fi client device may establish a Wi-Fi Direct connection on the adjacent clear Wi-Fi channel with the group owner device (Block 908). If the group owner device is capable of performing the dynamic frequency selection check (Block 916), the Wi-Fi client device may delegate the dynamic frequency selection check to the group owner device on the Wi-Fi Direct connection (Block 918). Otherwise, the Wi-Fi client device may execute an offline dynamic frequency selection check prior to establishing the Wi-Fi Direct connection (Block 920). The Wi-Fi client device may establish a Wi-Fi Direct connection on the dynamic frequency selection Wi-Fi channel with the group owner device (Block 908). The Wi-Fi client device may execute dynamic frequency selection checks at future intervals as mandated by the Federal Communications Commission, or may delegate this task to the group owner device.

Figure 10:
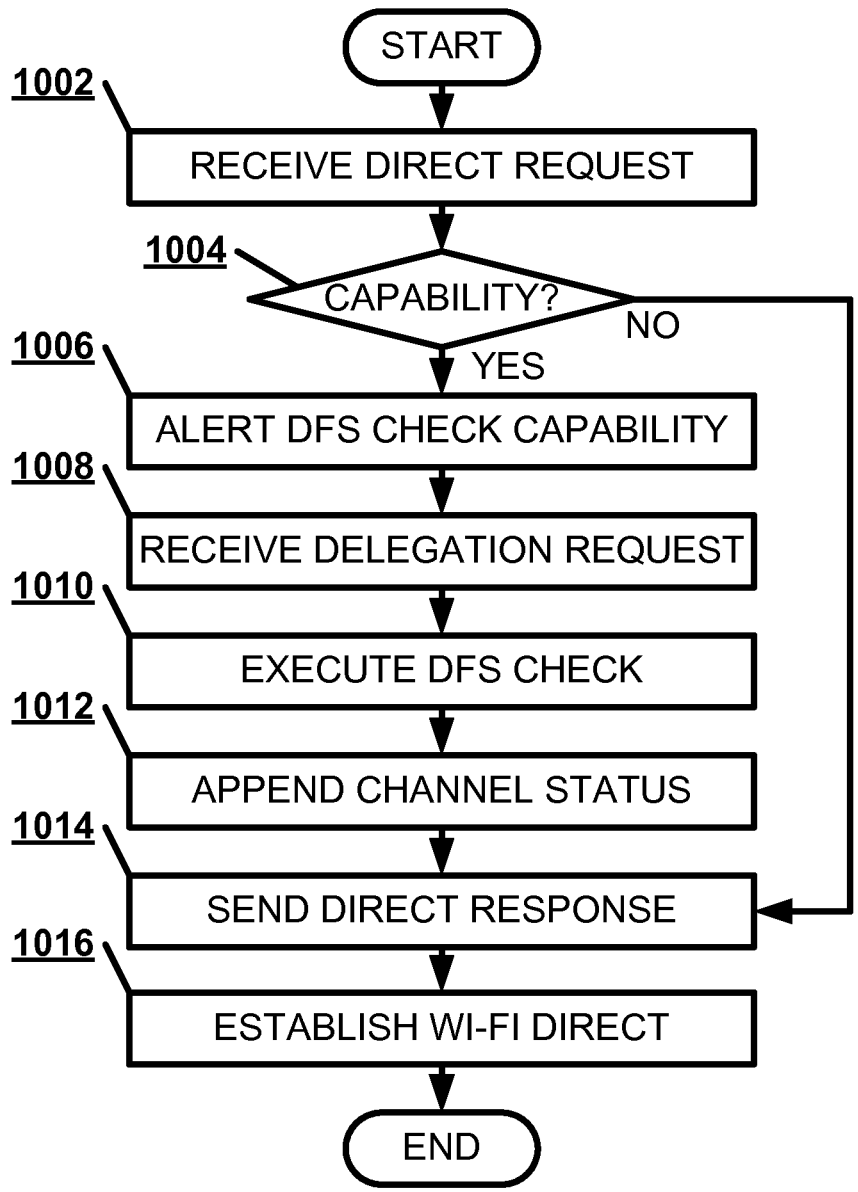
FIG. 10 illustrates, in a flowchart, one example of a method of establishing a Wi-Fi Direct connection with a Wi-Fi client device using a group owner device.

FIG. 10 illustrates, in a flowchart, one example of a method 1000 of establishing a Wi-Fi Direct connection with a Wi-Fi client device using a group owner device. The group owner device may receive a Wi-Fi Direct request from a Wi-Fi client device identifying a dynamic frequency selection Wi-Fi channel for a Wi-Fi Direct connection (Block 1002). If the group owner device is capable of executing the dynamic frequency selection check (Block 1004), the group owner device may alert the Wi-Fi client device to the dynamic frequency selection check capability of the group owner device (Block 1006). The group owner device may receive a delegation request from the Wi-Fi client device (Block 1008). The group owner device may execute a dynamic frequency selection check on the dynamic frequency selection Wi-Fi channel (Block 1010). The group owner device may append a channel status indicating the results of the dynamic frequency selection check to a Wi-Fi Direct response (Block 1012). The group owner device may send the Wi-Fi Direct response to the Wi-Fi client device (Block 1014). The group owner device may establish a Wi-Fi direct connection to the Wi-Fi client device on the dynamic frequency selection Wi-Fi channel (Block 1016). The group owner device may execute dynamic frequency selection checks at future intervals as mandated by the Federal Communications Commission, if delegate to perform this task by the Wi-Fi client device.

Figure 11:
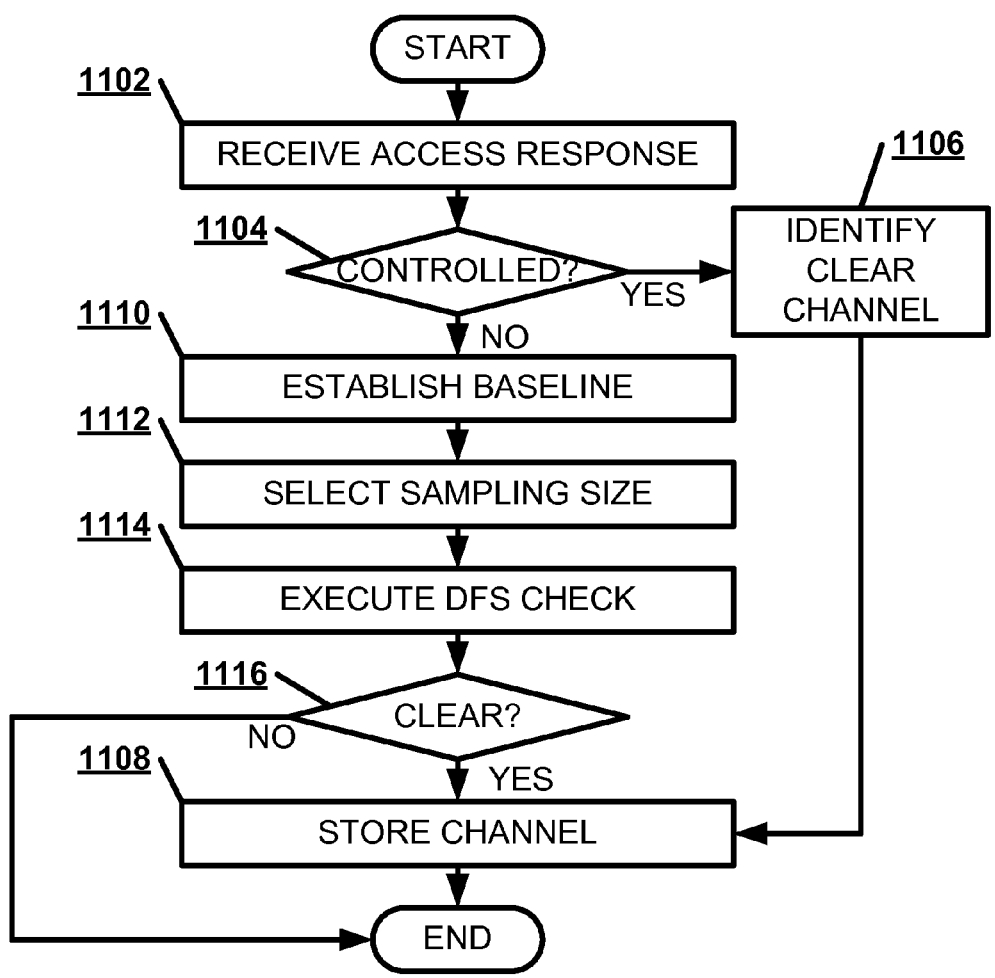
FIG. 11 illustrates, in a flowchart, one example of a method of executing a dynamic frequency selection check using a Wi-Fi client device.

FIG. 11 illustrates, in a flowchart, one example of a method 1100 of executing a dynamic frequency selection check using a Wi-Fi client device. The Wi-Fi client device may receive an access response from the internet service access point (Block 1102). If the Wi-Fi client device receives a controlled zone flag from the internet service access point indicating the Wi-Fi client device is in a controlled zone in the access response (Block 1104), the Wi-Fi client device may identify an active dynamic frequency selection Wi-Fi channel as a clear dynamic frequency selection channel (Block 1106). The Wi-Fi client device may store the active dynamic frequency selection Wi-Fi channel on a list of alternate cleared dynamic frequency selection channels (Block 1108). Otherwise, the Wi-Fi client device may establish a channel baseline measurement based on the Wi-Fi connection with an internet service access point (Block 1110). The Wi-Fi client device may select a sampling size for a dynamic frequency selection check for the dynamic frequency selection Wi-Fi channel based on the channel baseline measurement (Block 1112). The Wi-Fi client device may execute the dynamic frequency selection check using the sampling size on the dynamic frequency selection Wi-Fi channel (Block 1114). If the dynamic frequency selection check indicates that the dynamic frequency selection Wi-Fi channel clears the probability threshold (Block 1116), the Wi-Fi client device may store the dynamic frequency selection Wi-Fi channel on a list of alternate cleared dynamic frequency selection channels (Block 1108).

Figure 12:
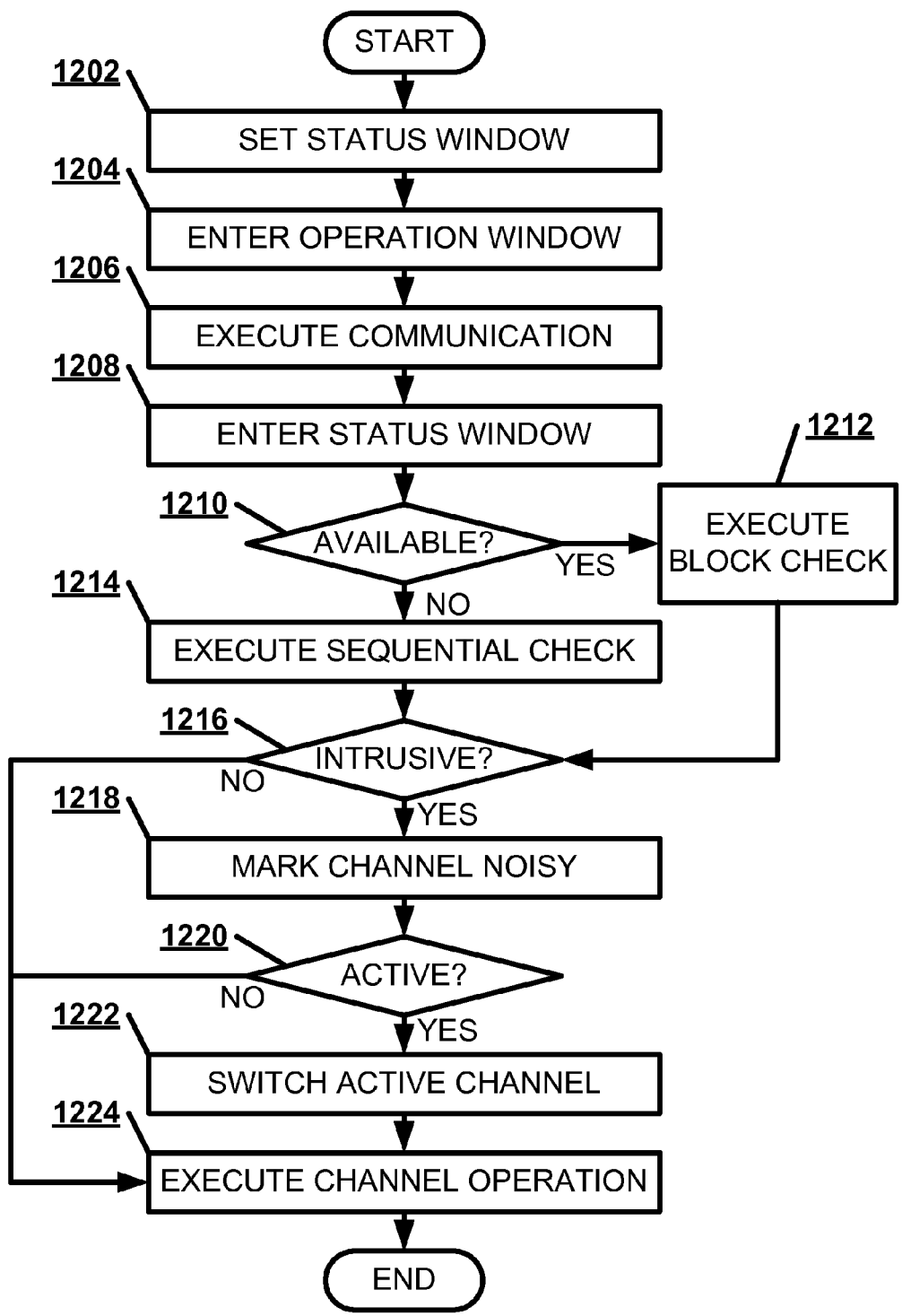
FIG. 12 illustrates, in a flowchart, one example of a method of executing a channel status check using a Wi-Fi client device.

The Wi-Fi device may modify the communication cycle of the communication interface to more efficiently perform channel operations. FIG. 12 illustrates, in a flowchart, one example of a method 1200 of executing a channel status check at a Wi-Fi client device. The Wi-Fi client device may set a status window for a communication cycle adjacent to an operation window for the communication cycle, so that the offline channel status check is executed outside the standby window of the communication cycle (Block 1202). The Wi-Fi client device may enter the operation window of the communication cycle (Block 1204). The Wi-Fi client device may execute a communication operation on an active Wi-Fi channel during the operation window of the communication cycle (Block 1206). The Wi-Fi client device may enter the status window of the communication cycle (Block 1208). If the space is available to perform an entire channel status check in the status window outside the operation window of the communication cycle (Block 1210), the Wi-Fi client device may execute the channel status check as a block channel status check (Block 1212). Otherwise, the Wi-Fi client device may execute the channel status check as a sequential channel status check, performing individual tasks of the channel status check spread out over multiple status windows (Block 1214). If the Wi-Fi client device detects an intrusive signal during the channel status check (Block 1216), the Wi-Fi client device may mark the examined channel as a noisy channel (Block 1218). If the examined channel is the active Wi-Fi channel (Block 1220), the Wi-Fi client device may switch to a clear available Wi-Fi channel as the active Wi-Fi channel (Block 1222). The Wi-Fi client device may execute a channel operation based on the channel status check (Block 1224).

Figure 13:
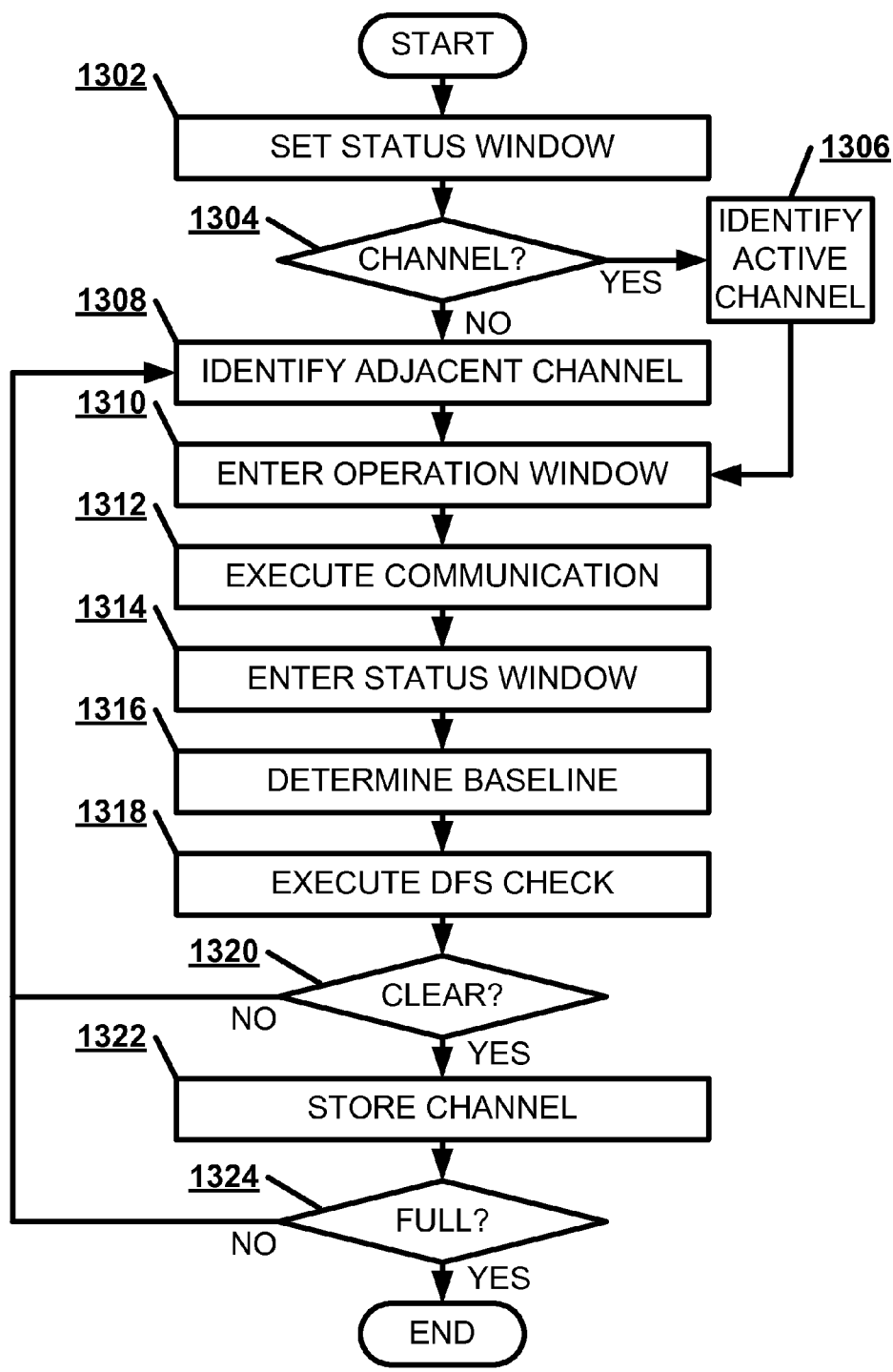
FIG. 13 illustrates, in a flowchart, one example of a method of executing a dynamic frequency selection check during a status window of a communication cycle using a Wi-Fi client device.

FIG. 13 illustrates, in a flowchart, one example of a method 1300 of executing a dynamic frequency selection check during a status window of a communication cycle at a Wi-Fi client device. The Wi-Fi client device may set a status window for a communication cycle adjacent to an operation window for the communication cycle (Block 1302). If the dynamic frequency selection Wi-Fi channel subject to the channel status check is an active Wi-Fi channel (Block 1304), the Wi-Fi client device may identify the dynamic frequency selection Wi-Fi channel as the active Wi-Fi channel (Block 1306). Otherwise, the Wi-Fi client device may identify an adjacent clear channel to the active Wi-Fi channel during a channel status check, such as a dynamic frequency selection check (Block 1308). The Wi-Fi client device may enter the operation window of the communication cycle (Block 1310). The Wi-Fi client device may execute a communication operation on an active Wi-Fi channel during the operation window of the communication cycle (Block 1312). The Wi-Fi client device may enter the status window of the communication cycle (Block 1314). The Wi-Fi client device may determine a channel measurement baseline for a dynamic frequency selection Wi-Fi channel as part of the channel status check (Block 1316). The Wi-Fi client device may execute the dynamic frequency selection check on the dynamic frequency selection Wi-Fi channel (Block 1318). If the dynamic frequency selection check indicates that the dynamic frequency selection Wi-Fi channel clears the probability threshold (Block 1320), the Wi-Fi client device may store the dynamic frequency selection Wi-Fi channel (Block 1322). If the channel list is not full (Block 1324), the Wi-Fi client device may identify an adjacent channel to the active Wi-Fi channel for a dynamic frequency selection check (Block 1308).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Examples within the scope of the present invention may also include computer-readable storage media for carrying or having computer-executable instructions or data structures stored thereon. Such computer-readable storage media may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic data storages, or any other medium which can be used to carry or store desired program code means in the form of computer-executable instructions or data structures. Combinations of the above should also be included within the scope of the computer-readable storage media.

Examples may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described examples are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A Wi-Fi client device, comprising:
   memory configured to store a channel baseline measurement representing prior knowledge of a clear channel according to a government regulation;
   a processor configured to select aサンsampling size for a dynamic frequency selection check to identify use of a frequency by a government entity for a probability threshold dictated by the government regulation based on the channel baseline measurement for a dynamic frequency selection Wi-Fi channel subject to dynamic frequency selection regulation; and
   a communication interface configured to execute the dynamic frequency selection check using the sampling size on the dynamic frequency selection Wi-Fi channel and to establish a Wi-Fi Direct connection on the clear channel following Wi-Fi Direct protocol for a peer-to-peer connection based on the dynamic frequency selection check.

2. The Wi-Fi client device of claim 1, wherein the processor is further configured to establish the channel baseline measurement based on a Wi-Fi connection with an internet service access point.

3. The Wi-Fi client device of claim 1, wherein the communication interface is further configured to execute an offline dynamic frequency selection check prior to establishing the Wi-Fi Direct connection.

4. The Wi-Fi client device of claim 1, wherein the communication interface is further configured to maintain the Wi-Fi Direct connection transferring data with the clear channel during an operation window of a communication cycle and perform a channel status check to determine a status of the clear channel in a status window outside the operation window of the communication cycle.

5. The Wi-Fi client device of claim 1, wherein the processor is further configured to identify an adjacent clear Wi-Fi channel.

6. The Wi-Fi client device of claim 1, wherein the communication interface is further configured to have an access virtual radio to maintain an access point connection on the dynamic frequency selection Wi-Fi channel and a direct virtual radio to maintain the Wi-Fi Direct connection on an adjacent clear Wi-Fi channel.

7. The Wi-Fi client device of claim 1, wherein the processor is further configured to identify an internet service access point transmitting on a clear Wi-Fi channel.

8. The Wi-Fi client device of claim 1, wherein the memory is configured to store a list of alternate clear dynamic frequency selection channels.

9. The Wi-Fi client device of claim 1, wherein the processor is further configured to reduce the sample size based on identifying a controlled zone flag from an internet service access point.

10. The Wi-Fi client device of claim 1, wherein the processor is further configured to identify a group owner device for the Wi-Fi Direct connection.

11. The Wi-Fi client device of claim 1, wherein the processor is further configured to delegate the dynamic frequency selection check to a group owner device on the Wi-Fi Direct connection.

12. A method, comprising:
storing a channel baseline measurement representing prior knowledge of a clear channel according to a government regulation;
selecting a sampling size for a dynamic frequency selection check to identify use of a frequency by a government entity for a probability threshold dictated by the government regulation based on the channel baseline measurement for a dynamic frequency selection Wi-Fi channel subject to dynamic frequency selection regulation; and
executing the dynamic frequency selection check using the sampling size on the dynamic frequency selection Wi-Fi channel and to establish a Wi-Fi Direct connection on the clear channel following Wi-Fi Direct protocol for a peer-to-peer connection based on the dynamic frequency selection check.

13. The method of claim 12, further comprising establishing the channel baseline measurement based on a Wi-Fi connection with an internet service access point.

14. The method of claim 12, further comprising executing an offline dynamic frequency selection check prior to establishing the Wi-Fi Direct connection.

15. The method of claim 12, further comprising maintaining the Wi-Fi Direct connection transferring data with the clear channel during an operation window of a communication cycle and perform a channel status check to determine a status of the clear channel in a status window outside the operation window of the communication cycle.

16. The method of claim 12, further comprising identifying an adjacent clear Wi-Fi channel.

17. The method of claim 12, further comprising maintaining an access point connection on the dynamic frequency selection Wi-Fi channel and a direct virtual radio to maintain the Wi-Fi Direct connection on an adjacent clear Wi-Fi channel.

18. The method of claim 12, further comprising identifying an internet service access point transmitting on a clear Wi-Fi channel.

19. The method of claim 12, further comprising storing a list of alternate clear dynamic frequency selection channels.

20. A non-transitory computer-readable medium storing computer executable code, comprising:
code for storing a channel baseline measurement representing prior knowledge of a clear channel according to a government regulation;
code for selecting a sampling size for a dynamic frequency selection check to identify use of a frequency by a government entity for a probability threshold dictated by the government regulation based on the channel baseline measurement for a dynamic frequency selection Wi-Fi channel subject to dynamic frequency selection regulation; and
code for executing the dynamic frequency selection check using the sampling size on the dynamic frequency selection Wi-Fi channel and to establish a Wi-Fi Direct connection on the clear channel following Wi-Fi Direct protocol for a peer-to-peer connection based on the dynamic frequency selection check.

* * * * *